US012783050B2

(12) United States Patent
Lu et al.

(10) Patent No.: US 12,783,050 B2
(45) Date of Patent: Nov. 3, 2026

(54) EMOTION RECOGNITION METHOD BASED ON SPATIO-TEMPORAL MULTI-SCALE ATTENTION CONVOLUTIONAL NEURAL NETWORK

(71) Applicant: Pengfei Lu, Shihezi (CN)

(72) Inventors: Pengfei Lu, Shihezi (CN); Han Cai, Shihezi (CN); Ping Zhou, Shihezi (CN)

( * ) Notice: Subject to any disclaimer, the term of this patent is extended or adjusted under 35 U.S.C. 154(b) by 0 days.

(21) Appl. No.: 19/437,605

(22) Filed: Dec. 31, 2025

(65) Prior Publication Data

US 2026/0126856 A1 May 7, 2026

(30) Foreign Application Priority Data

Mar. 27, 2025 (CN) ........................ 202510375412.1

(51) Int. Cl.
*G06F 3/01* (2006.01)
*G06N 3/0464* (2023.01)

(52) U.S. Cl.
CPC ........... *G06F 3/015* (2013.01); *G06N 3/0464* (2023.01)

(58) Field of Classification Search
CPC ........ G06F 3/015; G06F 18/241; G06F 18/10; G06F 18/213; G06F 18/214; G06F 18/25; G06N 3/0464; G06N 3/044; G06N 3/0442; G06N 3/045; G06N 3/0455; G06N 3/047; G06N 3/048; G06N 3/08; G06N 3/082; G06N 3/084; G06N 3/088; G06N 3/09; G06N 3/096; Y02D 10/00; A61B 5/369
See application file for complete search history.

(56) References Cited

U.S. PATENT DOCUMENTS

| | | | | |
|---|---|---|---|---|
| 11,900,566 | B1 * | 2/2024 | Ferrés | G06N 3/08 |
| 2020/0365125 | A1 * | 11/2020 | Senn | G06F 3/017 |
| 2021/0267474 | A1 * | 9/2021 | Wang | A61B 5/117 |
| 2025/0049376 | A1 * | 2/2025 | Du | A61B 5/7267 |
| 2025/0195894 | A1 * | 6/2025 | Berényi | A61N 1/36064 |
| 2025/0363385 | A1 * | 11/2025 | Galvin | G06N 3/0455 |

* cited by examiner

*Primary Examiner* — Andrew Sasinowski

(57) ABSTRACT

The invention discloses an emotion recognition method based on spatio-temporal multi-scale attention convolutional neural network, which comprises: collecting EEG data of subjects for preprocessing to obtain EEG data containing spatial dimension and temporal dimension; constructing a lightweight convolutional neural network including two-stream spatio-temporal feature construction layer, hybrid attention mechanism layer, high-order fusion layer and classification layer; wherein the two-stream spatio-temporal feature construction layer comprises a temporal feature extraction module and a parallel spatial feature extraction module; the high-order fusion layer is used to re-learn from the learned global convolution kernel to the representation of the local hemisphere convolution kernel; the trained lightweight convolutional neural network is used to identify EEG data, and the emotion recognition results of the subjects are obtained. By constructing a lightweight model with fewer parameters, the accuracy and efficiency of EEG-driven emotion recognition are improved.

9 Claims, 7 Drawing Sheets

(a) Global convolution kernel (b) Hemispherical convolution kernel (c) Local hemisphere convolution kernel

EMOTION RECOGNITION METHOD BASED ON SPATIO-TEMPORAL MULTI-SCALE ATTENTION CONVOLUTIONAL NEURAL NETWORK

TECHNICAL FIELD

The invention relates to the field of artificial intelligence, and relates to but is not limited to an emotion recognition method based on a spatio-temporal multi-scale attention convolutional neural network.

BACKGROUND

Emotion constitutes a fundamental element of human daily life. As a physiological state triggered by external stimuli, it not only influences decision-making, perception, interpersonal interaction, and cognitive intelligence, but is also closely linked to an individual's health, exerting a considerable impact on decision-making processes. Emotion recognition has been extensively investigated across multiple disciplines. For instance, in the treatment of mental health conditions such as generalized anxiety disorder and depression, emotion recognition plays a critical role, particularly within cognitive behavioral therapy, emotion regulation therapy, and emotion-focused therapy. Moreover, emotion recognition is also pivotal in the domain of human-computer interaction, enabling computers or intelligent robotic systems to interpret and respond to users' emotional states, thereby enhancing both the personalization and naturalness of the user experience.

Electroencephalography (EEG) signals capture the electrical activity generated by the brain, typically comprising various frequency bands including δ, θ, α, β, and γ waves. These EEG signals have been widely employed in emotion recognition, fatigue monitoring, and neuropsychological disorder research. Neural activity within the brain modulates emotional states through the coordination of the central nervous system and the autonomic nervous system. Moreover, the activity of distinct brain regions exhibits a strong correlation with specific emotional states. For example, heightened activity in the left prefrontal cortex is often associated with positive emotions, whereas increased activity in the right prefrontal cortex may correlate with negative emotions. This region-specific characteristic of EEG signals renders emotion recognition feasible.

Conventional approaches to emotion recognition using EEG signals generally involve manually engineered features derived from signal characteristics, such as analyzing intrinsic mode functions or employing a wavelet transform, followed by classification via machine learning-based techniques. In contrast, deep learning methods allow for the automatic learning of features directly from the raw signals, thereby alleviating the reliance on labor-intensive manual feature extraction.

The aforementioned conventional techniques exhibit the following limitations: (1) Their performance heavily depends on the quality of manually designed features, resulting in limited generalization and transferability when performing classification tasks; additionally, the process of manual feature extraction is often cumbersome and time-consuming. (2) Current manual feature extraction methods primarily focus on temporal characteristics of EEG signals, while overlooking spatial information inherent in the relationships among different electrode locations.

Deep learning-based approaches present the following issues: (1) Current research still predominantly emphasizes temporal feature extraction from EEG signals, mirroring the limitation of traditional methods in neglecting spatial interdependencies among electrode positions. (2) Many deep learning architectures, such as deep belief networks and stacked autoencoders, exhibit limited capability in processing two-dimensional data effectively; meanwhile, conventional convolutional neural networks tend to require a large number of parameters when applied to convolutional processing of EEG signals.

SUMMARY

In view of this, the embodiment of this invention provides an emotion recognition method based on a spatio-temporal multi-scale attention convolutional neural network, which at least solves the problem that the existing technology only extracts features from the temporal dimension of EEG signals, ignoring the spatial dimension information between different electrode positions and the problem of a large number of model parameters.

The technical scheme of the embodiment of the invention is as follows:

The embodiment of the invention provides an emotion recognition method based on a spatio-temporal multi-scale attention convolutional neural network, the method includes:

Collecting EEG data of a subject for preprocessing, and performing a channel mapping according to a physical position of an electrode to obtain EEG data containing spatial dimension and temporal dimension;

building a lightweight convolutional neural network including a two-stream spatio-temporal feature construction layer, a hybrid attention mechanism layer, a high-order fusion layer and a classification layer; among them, the two-stream spatio-temporal feature construction layer includes a temporal feature extraction module, configured to learn time-frequency feature representation by using a multi-scale one-dimensional temporal convolution kernel, and a parallel spatial feature extraction module, configured to learn an asymmetric representation between left and right hemispheres by using a hemispherical convolution kernel and a local hemispherical convolution kernel with a length corresponding to a count of channels in left and right hemispheres; the hybrid attention mechanism layer combines a channel attention mechanism, a spatial attention mechanism and a self-attention mechanism to enhance an ability of feature extraction and data processing; the high-order fusion layer is configured to relearn from a learned global convolution kernel to a representation of a local hemisphere convolution kernel;

using a trained lightweight convolutional neural network to identify the EEG data, and obtaining an emotional recognition result of the subject.

In some embodiments, the temporal feature extraction module includes a multi-scale one-dimensional temporal convolution kernel, a size $s_T^i$ of an i-th level one-dimensional temporal convolution kernel may be defined as $$s_T^i = (1, \delta^i \cdot f_s),$$

where $f_s$ is an EEG signal sampling rate, i∈[1, 2, . . . , L], L is a count of levels of the one-dimensional temporal convolution kernel layers, and proportional coefficients $\delta^i$ are 0.25, 0.5 and 1.0 when values of i are 1, 2 and 3, respectively; a scale coefficient corresponding to a high-level one-dimensional temporal convolution kernel is smaller than a scale coefficient corresponding to a low-level one-dimensional temporal convolution kernel.

In some embodiments, an output $$Z_{temporal}^i$$

of the i-th level one-dimensional temporal convolution kernel in the temporal feature extraction module is defined as $$Z_{temporal}^i = AP\left(\Phi_{L-ReLU}\left(Conv1D\left(X, s_T^i\right)\right)\right),$$

where X is input EEG data, Conv1D( ) is a one-dimensional convolution operation with a convolution kernel size of $$s_T^i$$

and a stride of (1,1), $\Phi_{L-ReLU}(\,)$ is a Leaky ReLU activation function, AP( ) is an average pooling operation; the output $$Z_{temporal}^i$$

of the one-dimensional temporal convolution kernel of each level will be connected in series along a temporal dimension, and a batch normalization operation is added to obtain an output of the temporal feature extraction module.

In some embodiments, the spatial feature extraction module has multi-scale one-dimensional spatial convolution kernels, including: a global convolution kernel, configured to learn global spatial information; a hemispheric convolution kernel and a local hemispheric convolution kernel, configured to extract a relationship between the left and right hemispheres through shared convolution kernels; a size $$s_S^j$$

of the one-dimensional spatial convolution kernel may be defined as $$s_S^j = (\delta^j \cdot c, 1),$$

where c is a total number of input EEG segment channels, and j takes 1, 2, and 3 to represent the global convolution kernel, hemispherical convolution kernel, and local hemispherical convolution kernel, and the corresponding $\delta^j$ are 0.25, 0.5, and 1.0, respectively; the output $$Z_{spatial}^j$$

of the j-th type of spatial convolution kernel is defined as $$Z_{spatial}^j = AP\left(\Phi_{L-ReLU}\left(Conv1D\left(Z_S, s_S^j\right)\right)\right);$$

Where $$Z_{spatial}^j \in R^{n \times s \times c_m \times f},$$

n is a count of samples, s is a count of one-dimensional space convolution kernels of each type, $c_m$ is a count of channels after a m-th spatial convolution, $f$ is a feature length after each spatial convolution operation, $Z_S$ is a multi-scale spatial representation generated by a parallel multi-scale spatial convolution kernel of the input EEG data, Conv1D( ) is an one-dimensional convolution operation, a convolution kernel size is $$s_S^j,$$

the stride of (c, 1) is configured for the global convolution kernel, the stride of (0.5×c, 1) is configured for the hemispheric convolution kernel, the stride of (0.25×c, 1) is configured for the local hemispheric convolution kernel, $\Phi_{L-ReLU}$ is the Leaky ReLU activation function, AP is an average pooling layer.

In some embodiments, the method also includes: For the EEG data input into the hemispheric convolution kernel, the Fz, Cz, Pz, Oz electrode data located in the midline position are deleted, and a channel arrangement order is set to [$channel_{left}$, $channel_{right}$], where $channel_{left}$ denotes a channel located in the left hemisphere and $channel_{right}$ denotes a channel located in the right hemisphere; the channel order on each hemisphere is rearranged so that each kernel weight is shared between electrode pairs symmetrically placed on the two hemispheres.

In some embodiments, the following operations are used in both temporal convolution operation and spatial convolution operation to reduce parameters and computation: first, independent deep convolution is performed on the input channel of each EEG data, and then a 1×1 convolution is used for feature combination between channels.

In some embodiments, in a self-attention mechanism part of a mixed attention mechanism layer, the self-attention mechanism part of a mixed attention mechanism layer is used, and a query vector Q, a key vector K and a value V are generated by using the formula [Q,K,V]=$z_0 U_{qkv}$; in the formula, $z_0$ is an input feature vector, $U_{qkv}$ is a linear transformation matrix; the self-attention output Attention(Q, K,V) is calculated by the following formula:

$$\text{Attention}(Q, K, V) = U_{proj}\left(D \odot Q \odot \left(U_{copy}\left(\frac{K}{\text{Scale}_K} \odot \frac{V}{\text{Scale}_V}\right)U_{sum}\right)\right);$$

$$\text{Scale}_V = \|V_{-1}\|_2, \ \text{Scale}_K = \|K_{-1}\|_2;$$

where D is a dynamic scaling matrix, $\odot$ denotes the Hadamard product, $U_{copy}$ and $U_{sum}$ are linear transformation matrices; $\text{Scale}_V$ is an L2 norm of V; $\text{Scale}_K$ is an L2 norm of K.

In some embodiments, in the hybrid attention mechanism layer, an improved Convolutional Block Attention Module (CBAM) is added to the spatial features output by the two-stream spatio-temporal feature construction layer; the improved CBAM module combines the channel attention mechanism and the spatial attention mechanism, and uses a feature map F output by the spatial feature extraction module as input to obtain a channel attention mapping $M_c(F)$ and a spatial attention mapping $M_s(F')$ in turn, and uses the convolutional layer as a shared network to replace a shared MLP layer in an original CBAM, a final feature representation is output; the convolution layer is composed of a convolution containing a hidden layer; $M_c(F)$ and $M_s(F)$ are calculated by the following formulas:

$$M_c(F) = \sigma\left(W_1\left(W_0\left(F^c_{avg}\right)\right) + W_1\left(W_0\left(F^c_{max}\right)\right)\right) = \sigma(Conv(AvgPool(F) + Conv(MaxPool(F))));$$

$$M_s(F) = \sigma\left(f^k([AvgPool(F); MaxPool(F)])\right) = \sigma\left(f^k\left(\left[F^s_{avg}; F^s_{max}\right]\right)\right);$$

where AvgPool(F) and MaxPool(F) respectively denote the average pooling operation and a maximum pooling operation of the feature map F output by the spatial feature extraction module, AvgPool(F') and MaxPool (F') respectively denote the average pooling operation and the maximum pooling operation of the feature map F' output by the channel attention;

$F^c_{avg}$ and $F^c_{max}$ are the average pooling feature and the maximum pooling feature in the channel attention, respectively;

$F^s_{avg}$ and $F^s_{max}$ are the average pooling feature and the maximum pooling feature in spatial attention, respectively; both $W_0$ and $W_1$ are weight matrices that may be learned, $f^k$ denotes convolution operations, and $\sigma(\ )$ is a Sigmoid function.

In some embodiments, the high-level fusion layer is used to use a one-dimensional convolution layer with a kernel size of (3,1) to fuse learning information from global convolution kernels, hemispheric convolution kernels, and local hemispheric convolution kernels along the spatial dimension; the temporal features are added as additional feature inputs, and a final learned spatio-temporal feature representation $Z_{fusion}$ of global hemispheric fusion is generated by the following formulas:

$$Z_{fusion} = GAP(f_{bn}(AP(\Phi_{L\text{-}ReLu}(Conv1D(Z, (3, 1))))));$$

$$Z = \text{Attention}(Q, K, V) + F'' + F;$$

where Z denotes a splicing of the feature map F output by the self-attention output Attention(Q,K,V) and the spatial feature extraction module and the spatial feature output F" by CBAM processing of F, $f_{bn}$ is a batch normalization function, GAP( ) denotes a global average pooling layer, $\Phi_{L\text{-}ReLU}$ is the Leaky ReLU activation function, AP is the average pooling layer, Conv1D( ) denotes the one-dimensional convolution operation, and the convolution kernel size is (3,1);

$Z_{fusion}$ is input into a fully connected layer and activated by a softmax function, a final output OutPut may be calculated in the following ways:

$$OutPut = \Phi_{softmax}(W'\Phi_{dp}(\Phi_{ReLU}(W(\Gamma(Z_{fusion})) + b)) + b');$$

where $\Gamma$ is a squeeze operation, W and W' are trainable weight matrices, b and b' are deviation terms, $\Phi_{ReLU}$ is a ReLU activation function, applied to an output of linear transformation, $\Phi_{dp}$ is a dropout operation, configured to prevent overfitting, and $\Phi_{softmax}$ is a softmax function, configured to convert the output into a probability distribution.

The beneficial effects of the technical scheme provided by the embodiment of the invention include at least:

In the embodiment of the invention, a lightweight spatio-temporal multi-scale attention convolutional neural network emotion recognition method is proposed. The model can not only extract the features of the data in the temporal dimension, but also combine the brain asymmetry principle of neuroscience research. In the design of the convolution kernel, the brain emotional asymmetry is introduced. By using the hemispherical convolution kernel whose length corresponds to the number of left and right hemisphere channels and the local hemispherical convolution kernel whose length corresponds to half of the number of left and right hemisphere channels, the hemispherical asymmetry pattern related to emotional state is extracted, which is helpful to improve the accuracy of emotion recognition.

BRIEF DESCRIPTION OF THE DRAWINGS

In order to more clearly explain the technical scheme of the embodiment of the invention, the following will briefly introduce the drawings needed to be used in the description of the embodiment. Obviously, the drawings in the following description are only some embodiments of the invention. For the ordinary technical personnel in this field, other drawings may be obtained according to these drawings without paying creative labor. Among them.

DETAILED DESCRIPTION OF THE EMBODIMENTS

In order to clarify the objectives, technical solutions, and advantages of the embodiments of the present invention, the technical solutions of the embodiments will be described clearly and comprehensively below in conjunction with the accompanying drawings of the embodiments. It is apparent that the described embodiments represent only a portion of the embodiments of the present invention, and not all of them. The following embodiments are provided to illustrate the invention, but are not intended to limit its scope. Based on the embodiments described herein, all other embodiments obtained by a person of ordinary skill in the art without creative effort shall fall within the protection scope of the present invention.

The following description refers to "some embodiments," which describe a subset of all possible embodiments. It should be understood that "some embodiments" may refer to the same subset or different subsets of all possible embodiments and may be combined with each other provided that no conflict arises.

It should be noted that the terms "first/second/third" used in the embodiments of the present invention are intended only to distinguish between similar objects and do not imply any specific ordering thereof. It is understood that "first/second/third" may be interchanged in a specific order or sequence where permitted, such that the embodiments described herein may be implemented in sequences other than those illustrated or described.

A person skilled in the relevant art will understand that, unless otherwise defined, all terms used herein (including technical and scientific terms) have the same meaning as commonly understood by one of ordinary skill in the art to which the embodiments of the invention pertain. It shall be further understood that terms defined in general dictionaries shall be construed to have meanings consistent with their meanings in the context of the prior art, and shall not be interpreted in an idealized or overly formal sense unless explicitly defined as such herein.

Figure 1:
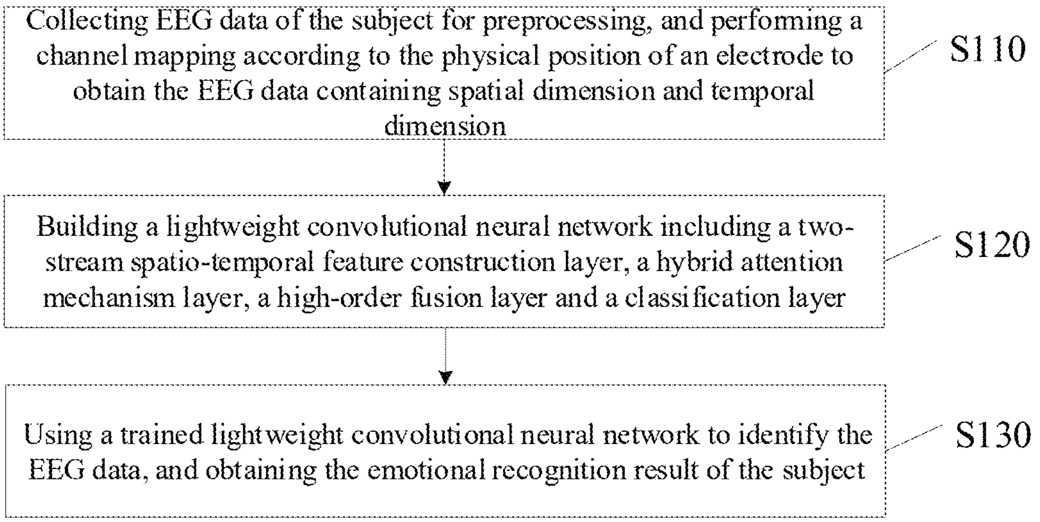
FIG. 1 is a flow diagram of an emotion recognition method based on a spatio-temporal multi-scale attention convolutional neural network provided by the embodiment of the invention.

FIG. 1 is a flow diagram of an emotion recognition method based on a spatio-temporal multi-scale attention convolutional neural network provided by the embodiment of the invention. As shown in FIG. 1, the method includes at least the following steps:

S110, the EEG data of the subjects are collected for preprocessing, and the channel mapping is performed according to the physical position of the electrode to obtain EEG data including spatial dimension and temporal dimension.

Here, EEG data is regarded as a two-dimensional time series, and its dimensions are the spatial dimension (EEG electrode position distribution) and the temporal dimension, respectively. The temporal dimension reflects the change of brain activity over time. The spatial dimension shows the activation patterns of different functional regions through different electrode positions on the brain.

S120, a lightweight convolutional neural network including a two-stream spatio-temporal feature construction layer, a hybrid attention mechanism layer, a high-order fusion layer, and a classification layer is constructed.

Figure 2:
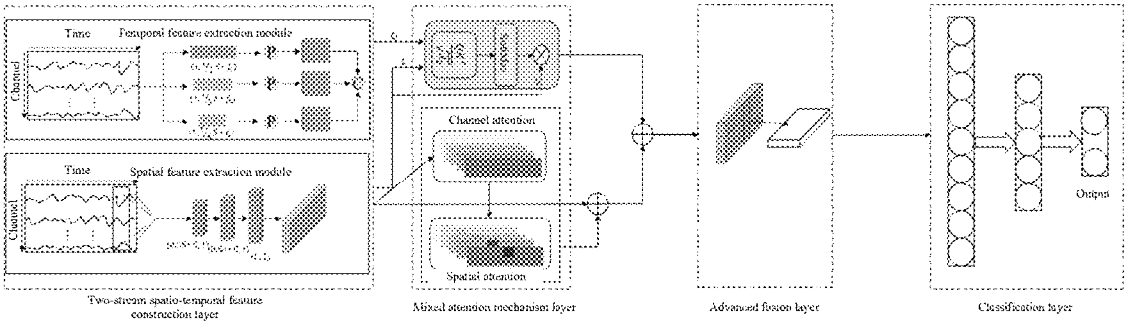
FIG. 2 is an overall architecture diagram of the lightweight convolutional neural network provided by the embodiment of the invention.

Here, as shown in FIG. 2, the two-stream spatio-temporal feature construction layer includes: a temporal feature extraction module, configured to learn time-frequency feature representation by using a multi-scale one-dimensional temporal convolution kernel, and a parallel spatial feature extraction module, configured to learn an asymmetric representation between left and right hemispheres by using a hemispherical convolution kernel and a local hemispherical convolution kernel with a length corresponding to the count of channels in left and right hemispheres; the hybrid attention mechanism layer combines a channel attention mechanism, a spatial attention mechanism and a self-attention mechanism to enhance the ability of feature extraction and data processing; the high-order fusion layer is configured to relearn from a learned global convolution kernel to a representation of a local hemisphere convolution kernel.

The two-stream spatio-temporal feature construction layer is designed to extract features across varying temporal and spatial dimensions from the input data. To obtain more discriminative time-frequency representations, the temporal feature extraction module within this layer employs multi-scale one-dimensional temporal convolution kernels, thereby enriching the learned time-frequency features. The spatial feature extraction module incorporates insights from neuroscience, specifically, the asymmetry in the relationship between brain hemisphere activity and emotion. It utilizes hemispherical and local hemispherical convolution kernels to learn asymmetric representations between the left and right hemispheres. This design enables the final model to capture patterns and variations in the data across multiple scales.

The hybrid attention mechanism layer serves as a feature enhancement module that integrates self-attention, channel attention, and spatial attention. This combination strengthens the model's capacity to interpret complex data. The self-attention mechanism captures long-range dependencies by computing similarity scores among input features, facilitating a better understanding of contextual information. The channel attention mechanism refines feature representation by adaptively weighting each channel of the feature map, thereby emphasizing informative channels and suppressing less relevant ones. Meanwhile, the spatial attention mechanism identifies key regions in the feature map and enhances the model's sensitivity to spatial information. Through this integrated structure, the model can more effectively identify and leverage critical information within the input data.

The high-level fusion layer integrates learned information from global convolution kernels, hemispherical convolution kernels, and local hemispherical convolution kernels to construct high-level spatial representations, while also incorporating temporal features as supplementary inputs. This architecture enhances the compactness of the network and improves its suitability for real-time applications.

The lightweight convolutional neural network aims to identify the most significant time-frequency-channel specific EEG features corresponding to the user's emotional state.

S130, the trained lightweight convolutional neural network is used to identify the EEG data, and the emotional recognition result of the subject is obtained.

Here, the EEG data is input into the trained lightweight convolutional neural network, and the emotion recognition results are output through the classification layer. The results are specific emotional dimensions, such as arousal, valence, or dominance.

The embodiment of the invention introduces a lightweight convolutional neural network based on a spatio-temporal multi-scale attention mechanism to enhance the accuracy and efficiency of EEG-based emotion recognition. By comprehensively extracting temporal and spatial features from EEG signals and incorporating the principle of cerebral emotional asymmetry, the model effectively captures hemispheric asymmetry patterns associated with emotional states, thereby improving recognition performance. Furthermore, this approach reduces reliance on manual feature engineering, increasing both the automation and robustness of the system. Through the design of a compact model architecture with a reduced parameter count, the generalization capability and portability of the model are strengthened, enabling reliable performance across diverse individuals and environmental conditions. Finally, the proposed method demonstrates promising potential for practical applications in mental health intervention and human-computer interaction, facilitating the development of intelligent and personalized services.

In some embodiments, the temporal feature extraction module includes a multi-scale one-dimensional temporal convolution kernel, the size $$s_T^i$$

of the i-th level one-dimensional temporal convolution kernel may be defined as $$s_T^i = \left(1, \delta^i \cdot f_s\right),$$

where $f_s$ is an EEG signal sampling rate, $i \in [1, 2, \ldots, L]$, L is a count of levels of the one-dimensional temporal convolution kernel layers, and proportional coefficients $\delta^i$ are 0.25, 0.5 and 1.0 when values of i are 1, 2 and 3, respectively; the scale coefficient corresponding to the high-level one-dimensional temporal convolution kernel is smaller than the scale coefficient corresponding to the low-level one-dimensional temporal convolution kernel.

Here, in order to enable the neural network to learn dynamic time representation, the length of the one-dimensional temporal convolution kernel is set to a specific proportion of the EEG signal sampling rate $f_s$. These proportional coefficients are defined as $\delta^i \in R$, where is the level of the number of layers of the temporal convolution kernel. If the number of temporal convolution kernel layers has a level, it will change from 1 to.

Emotion-related activation is mainly observed in Alpha (8-12 Hz), Beta (12-30 Hz) and Gamma (more than 30 Hz) bands. In this work, the invention extends the time receptive field, changes the scale coefficient $\delta^i$ into [0.25, 0.50, 1.00], and sets L=3, i=1 to 3 to characterize the frequency of learning diversification. The invention assumes that the multi-scale temporal convolution kernel can learn rich dynamic frequency representation from EEG and provide more emotion-related information. From the perspective of time, multi-scale T-convolution kernels can capture long-term and short-term temporal patterns and learn more diverse representations. The high-level T-convolution kernel has a small proportional coefficient, so the convolution kernel length is short, and vice versa. Long-term convolution kernels can learn diverse representations of long-term time and low frequency, while short convolution kernels extract short-term time and high frequency representations.

In some embodiments, the output $$Z_{temporal}^i$$

of the i-th level one-dimensional temporal convolution kernel in the temporal feature extraction module is defined as $$Z_{temporal}^i = AP\left(\Phi_{L\text{-}ReLU}\left(Conv1D\left(X, s_T^i\right)\right)\right),$$

where X is input EEG data, Conv1D( ) is a one-dimensional convolution operation with a convolution kernel size of $$s_T^i$$

and a stride of (1,1), $\Phi_{L\text{-}ReLU}(\ )$ is a Leaky ReLU activation function, AP( ) is an average pooling operation; the output $$Z_{temporal}^i$$

of the one-dimensional temporal convolution kernel of each level will be connected in series along the temporal dimension, and a batch normalization operation is added to obtain the output of the temporal feature extraction module.

Here, let X denote the EEG input sample, $X=[X^0, X^1, \ldots, X^n]$, $X^n \in R^{c\times 1}$, where n is the count of EEG samples, c is the number of channels, and is the length of each sample. The multi-scale temporal representation may be generated by parallel multi-scale temporal convolution kernels of input EEG samples, and then, after Leaky ReLU activation function, the feature map is further down-sampled by Average Pooling (AP). The reason why AP is used is to reduce the influence of noise and the feature dimension, because EEG signals have a high dimension and a low signal-to-noise ratio. Let the output of the temporal convolution kernel in the i-th level be $$Z_{temporal}^i \in R^{n\times t\times c\times \Sigma f_i},$$

where n is the number of samples, t is the count of T-convolution kernels at each level, c is a count of channels, and $f_i$ is a feature length after the i-th level convolution operation.

Let L=3, and i takes 1, 2, 3 respectively. The output of the temporal feature extraction module is:

$$Y_T = f_{bn}\left(concat\left(f_{bn}\left(Z^1_{temproal}\right), f_{bn}\left(Z^2_{temproal}\right), f_{bn}\left(Z^3_{temproal}\right)\right), \dim = 1\right);$$

where $f_{bn}$ is a batch normalization operation, concat is a splicing operation, and dim=1 denotes the temporal dimension;

therefore, the output of one-dimensional temporal convolution kernels at each level will be connected in series along the temporal dimension, and batch normalization may be added after the temporal feature module. Thus, it reduces the internal covariate shift problem in the neural network.

In some embodiments, the spatial feature extraction module has multi-scale one-dimensional spatial convolution kernels, including: a global convolution kernel, configured to learn global spatial information; a hemispheric convolution kernel and a local hemispheric convolution kernel, configured to extract the relationship between the left and right hemispheres through shared convolution kernels; the size $$s^j_S$$

of the one-dimensional spatial convolution kernel may be defined as $$s^j_S = \left(\delta^j \cdot c, 1\right),$$

where c is the total number of input EEG segment channels, and j takes 1, 2, and 3 to represent the global convolution kernel, hemispherical convolution kernel, and local hemispherical convolution kernel, and the corresponding $\delta^i$ are 0.25, 0.5, and 1.0, respectively; the output $$Z^j_{spatial}$$

of the j-th type of spatial convolution kernel is defined as $$Z^j_{spatial} = AP\left(\Phi_{L-ReLU}\left(Conv1D\left(Z_S, s^j_S\right)\right)\right);$$

where $$Z^j_{spatial} \in R^{n \times s \times c_m \times f},$$

n is a count of samples, s is a count of one-dimensional space convolution kernels of each type, $c_m$ is a count of channels after a m-th spatial convolution, $f$ is a feature length after each spatial convolution operation, $Z_S$ is a multi-scale spatial representation generated by a parallel multi-scale spatial convolution kernel of the input EEG data, Conv1D( ) is an one-dimensional convolution operation, a convolution kernel size is $$s^j_S,$$

the stride of (c, 1) is configured for the global convolution kernel, the size of (0.5×c, 1) is configured for the hemispheric convolution kernel, the size of (0.25×c, 1) is configured for the local hemispheric convolution kernel, $\Phi_{L-ReLU}$ is the Leaky ReLU activation function, AP is an average pooling layer.

Here, the size of the convolution kernel in one-dimensional space is related to the position of the EEG electrode channel. The size of the global spatial convolution kernel is, where is the number of channels. Since the length of the kernel is the same as the dimension of the input EEG channel, it can learn global spatial information. In the embodiment of the invention, the frontal lobe region which is asymmetrical to the brain emotion is combined into the kernel design. The proposed hemisphere space convolution kernel and the local hemisphere space convolution kernel extract the relationship between the left and right hemispheres by sharing the convolution kernel. The size of the hemisphere space convolution kernel is (0.5·c,1), and the stride is also (0.5·c,1). The size of the local hemisphere space convolution kernel is (0.25·c,1), and the stride is also (0.25·c,1), where c is the total number of channels. The hemisphere core is shared by two hemispheres and does not overlap, so that asymmetric patterns may be extracted.

In some embodiments, the method also includes: for the EEG data input into the hemispheric convolution kernel, the Fz, Cz, Pz, Oz electrode data at the midline position are deleted, and the channel arrangement order is set to [channel$_{left}$,channel$_{right}$], where channel$_{left}$ denotes the channel located in the left hemisphere, and channel$_{right}$ denotes the channel located in the right hemisphere; the channel order on each hemisphere is rearranged so that each kernel weight is shared between the electrode pairs symmetrically placed on the two hemispheres.

Figure 3:
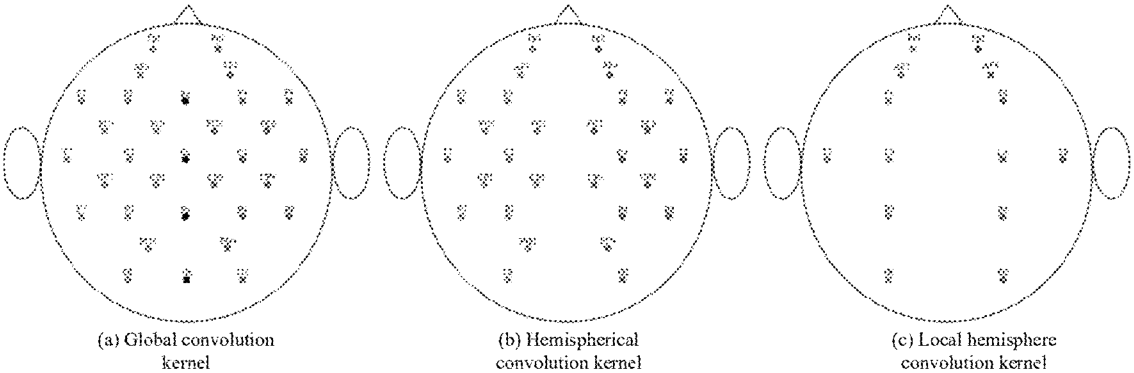
FIG. 3 is a schematic diagram of electrode position processing of three spatial convolution kernels provided by the embodiment of the invention; among them, (a) is a global convolution kernel, (b) is a hemispherical convolution kernel, and (c) is a local hemispherical convolution kernel.

Here, the frontal lobe region associated with brain emotional asymmetry is considered during spatial feature extraction. Due to findings in brain asymmetry and emotional processing, researchers typically focus on differences in activity between the left and right hemispheres. Electrodes such as Fz, Cz, Pz, and Oz are situated along the midline and cannot provide independent information about the left and right hemispheres. Therefore, when comparing activities between the left and right hemispheres, data from these midline electrode positions in the dataset of the embodiment of the invention are excluded. The process is illustrated in FIG. 3, where part (a) represents the global convolution kernel, part (b) the hemispherical convolution kernel, and part (c) the local hemispherical convolution kernel. It can be observed from (a) to (b) that before applying the hemispherical convolution kernel, the data from the midline electrodes Fz, Cz, Pz, and Oz are deleted.

In some embodiments, the following operations are used in both temporal convolution operation and spatial convolution operation to reduce parameters and computation: first, independent deep convolution is performed on the input channel of each EEG data, and then 1×1 convolution is used for feature combination between channels.

Here, assuming that the input feature map is X, the output of the deep convolution is $X_d$, and the output of the point convolution (1×1 convolution) is $X_p$, then there is:

$$X_d = DepthwiseConv\,(X);$$

$$X_p = PointwiseConv\,(X_d);$$

in the traditional convolution operation, the size of the convolution kernel is K×K×C, where K is the spatial size of the convolution kernel, and C is the count of channels of the input feature map. For each output channel, such a convolution kernel is applied. Therefore, the amount of calculation and the number of parameters are proportional to the number of input and output channels, and the amount of calculation is K×K×C×N×H×W. The amounts of calculation of deep convolution and point convolution in DSC are K×K×C×H×W, 1×1×C×N×H×W, respectively, and the total amount of calculation is K×K×C×H×W+1×1×C×N×H×W, where H and W are the height and width of the feature map, and N is the count of output channels. Therefore, compared with standard convolution, the depthwise separable convolution reduces the computational complexity from K×K×C×N×H×W to K×K×C×H×W+1×1×C×N×H×W.

In this way, the Depthwise Separable Convolution (DSC) technique is used in the temporal convolution operation and the spatial convolution operation. Firstly, the independent spatial convolution (deep convolution) is performed on each input channel, and then the lxi convolution (dot convolution) is used to perform feature combination between channels. This significantly reduces the parameters and calculations.

In some embodiments, in the self-attention mechanism part of the mixed attention mechanism layer, the self-attention mechanism part of the mixed attention mechanism layer is used, and a query vector Q, a key vector K and a value V are generated by using the formula $[Q,K,V]=z_0U_{qkv}$; in the formula, $z_0$ is an input feature vector, $U_{qkv}$ is a linear transformation matrix; the self-attention output Attention(Q, K,V) is calculated by the following formula:

$$\text{Attention}\ (Q, K, V\} = U_{proj}\left(D \odot Q \odot \left(U_{copy}\left(\frac{K}{\text{Scale}_K} \odot \frac{V}{\text{Scale}_V}\right)U_{sum}\right)\right);$$

$$\text{Scale}_V = \|V_{-1}\|_2,\ \text{Scale}_K = \|K_{-1}\|_2;$$

where D is a dynamic scaling matrix, $\odot$ denotes the Hadamard product, $U_{copy}$ and $U_{sum}$ are linear transformation matrices; $\text{Scale}_V$ is an L2 norm of V; $\text{Scale}_K$ is an L2 norm of K.

Figure 4:
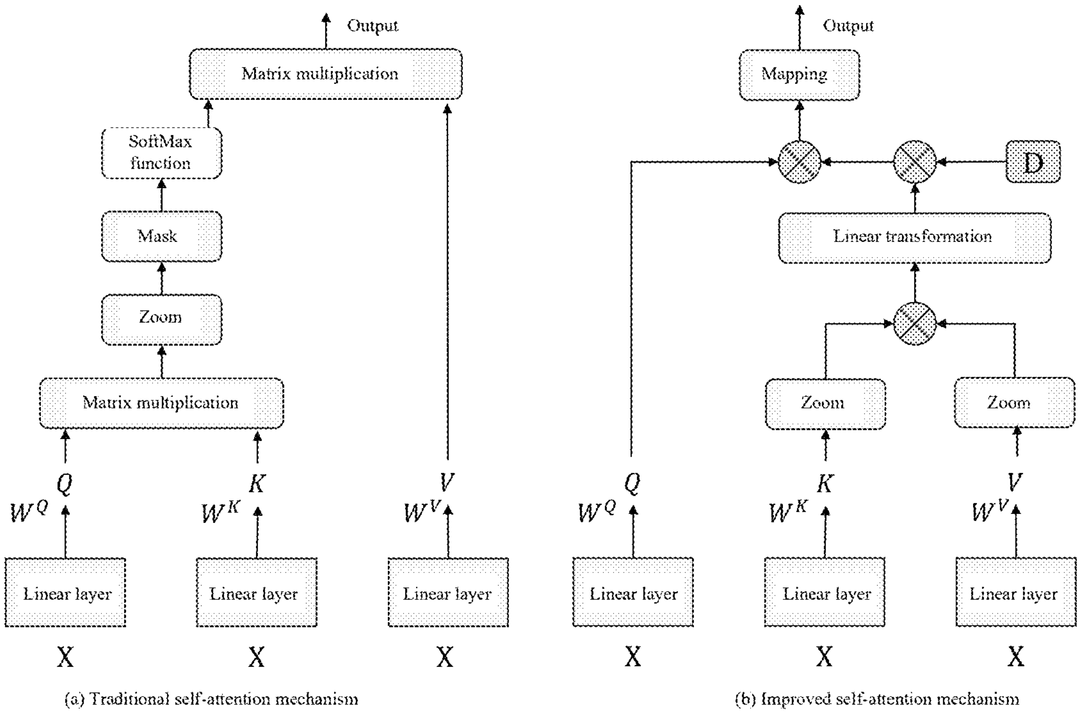
FIG. 4 is a schematic diagram of the self-attention mechanism provided by the embodiment of the invention; among them, (a) is a traditional self-attention mechanism, (a) is an improved self-attention mechanism.

Here, the principle of the self-attention mechanism is shown in FIG. 4, where (a) is the traditional self-attention mechanism and (a) is the improved self-attention mechanism. It may be seen that the traditional self-attention mechanism (Self-Attention) can effectively capture long-distance dependencies by calculating the relationship between each element in the input sequence, and overcome the limitations of the traditional recurrent neural network (RNN) in dealing with long sequences. The core idea of self-attention is to convert the input vector into three different representations: Query, Key, and Value. The attention score is generated by calculating the dot product of the query and the key, and the Softmax function is used to convert it into a probability distribution, so that the value is weighted and summed to obtain the final output.

The invention generates a query (Q), a key (K), and a value (V) by multiplying the input feature vector with a linear transformation matrix. Then use the formula to calculate the self-attention output. Through dynamic scaling and linear transformation, the model can effectively process the input queries, keys, and values. Finally, the output of the self-attention mechanism is obtained by projection. In order to improve the stability and performance of the model, the query (Q), key (K), and value (V) are normalized by defining the L2 norm. Here, the L2 norm is used to normalize the vector, ensuring numerical stability when calculating attention.

In some embodiments, in the hybrid attention mechanism layer, an improved Convolutional Block Attention Module (CBAM) is added to the spatial features output by the two-stream spatio-temporal feature construction layer; the improved CBAM module combines the channel attention mechanism and the spatial attention mechanism, and uses a feature map F output by the spatial feature extraction module as input to obtain a channel attention mapping $M_c(F)$ and a spatial attention mapping $M_s(F')$ in turn, and uses the convolutional layer as a shared network to replace a shared MLP layer in an original CBAM, the final feature representation is output; the convolution layer is composed of a convolution containing a hidden layer; $M_c(F)$ and $M_s(F)$ are calculated by the following formulas:

$$M_c\,(F) = \sigma\left(W_1\left(W_0\left(F^c_{avg}\right)\right) + W_1(W_0(F^c_{max}))\right) = \sigma\,(Conv\,(AvgPool(F) + Conv(MaxPool(F))));$$

$$M_s(F) = \sigma\left(f^k([AvgPool(F);\ MaxPool(F)])\right) = \sigma\left(f^k\left(\left[F^s_{avg};\ F^s_{max}\right]\right)\right);$$

where AvgPool(F) and MaxPool(F) respectively denote the average pooling operation and a maximum pooling operation of the feature map F output by the spatial feature extraction module, AvgPool(F') and MaxPool (F') respectively denote the average pooling operation and the maximum pooling operation of the feature map F' output by the channel attention;

$$F^c_{avg} \text{ and } F^c_{max}$$

are the average pooling feature and the maximum pooling feature in the channel attention, respectively;

$$F^s_{avg} \text{ and } F^s_{max}$$

are the average pooling feature and the maximum pooling feature in spatial attention, respectively; both $W_0$ and $W_1$ are weight matrices that may be learned, $f^k$ denotes convolution operations, and σ( ) is a Sigmoid function.

Figure 5:
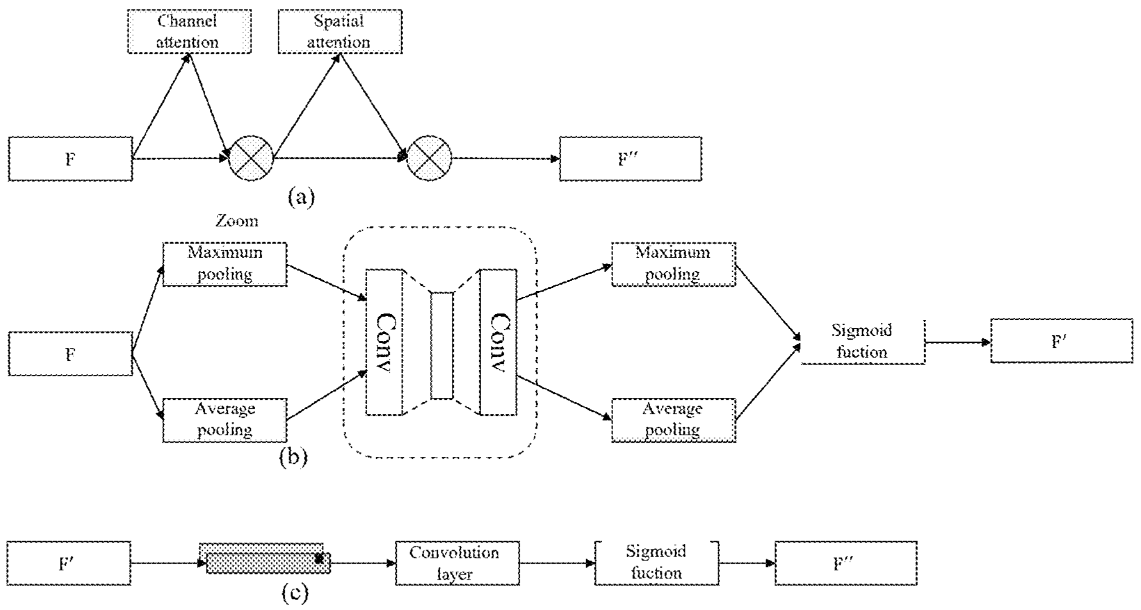
FIG. 5 is the structural diagram of the CBAM module provided by the embodiment of the invention; among them, (a) is a whole CBAM structure, (b) is a channel attention structure, and (c) is a spatial attention structure.

Here, since the convolution operation extracts information features by mixing cross-channel and spatial information, it is important to add attention representations in the channel dimension and the spatial dimension, because not every channel and spatial location are equally important. The embodiment of the invention adds a CBAM module after the spatial features of the output of the two-stream spatio-temporal feature construction layer. It takes the feature map $F \in R^{C \times L}$ output by the spatial feature extraction module as input, where C denotes a count of channels and L denotes the spatial dimension of the feature map. The structure diagram of the CBAM module is shown in FIG. 5, where (a) is the overall CBAM structure, (b) is the channel attention structure, and (c) is the spatial attention structure.

CBAM first calculates channel attention mapping $M_c \in R^{C\times1}$. In channel attention, average pooling and maximum pooling are used to aggregate spatial information. Among them, the average pooling calculates the average value of the elements in the pooling window, and the maximum pooling calculates the maximum value of the elements in the pooling window. Through average pooling and maximum pooling, the average pooling feature $$F_{avg}^{C}$$

and the maximum pooling feature $$F_{max}^{C}$$

are generated, respectively. These two features are transmitted through the shared network to generate channel attention mapping. The update process of the final channel attention output feature map may be represented by the following formula:

$$F' = M_c(F) \otimes F;$$

where ⊗ denotes the multiplication of elements one by one, F' denotes the output of channel attention.

Next, CBAM computes spatial attention mapping $M_s \in R^{1\times L}$, which is generated by aggregating channel information. Spatial attention first aggregates the channel information of the channel attention output feature F' through two pooling operations to generate two maps, representing the average pooling feature $$F_{avg}^{s} \in R^{1\times L}$$

and the maximum pooling feature $$F_{max}^{s} \in R^{1\times L}$$

of the cross-channel. After the two features are connected, the spatial attention map is generated through the convolution layer. After the weighting of channel attention and spatial attention, the update process of the final feature map is:

$$F'' = M_s(F') \otimes F';$$

where ⊗ denotes the multiplication of elements one by one, F' denotes the output of channel attention, and F" denotes the final output through CBAM.

When the input spatial features pass through the channel attention and spatial attention in CBAM in turn, the shared MLP layer in the original CBAM is improved to a convolutional layer, which allows the model to reduce the number of parameters. The shared network consists of a convolution containing a hidden layer. In order to reduce the parameter overhead, the output of the hidden layer is $R^{C/r\times1}$, where r is the scaling rate. In this way, CBAM can more effectively focus on important feature channels and spatial locations, thereby improving the overall performance of the model.

In some embodiments, the high-level fusion layer is used to use a one-dimensional convolution layer with a kernel size of (3,1) to fuse learning information from global convolution kernels, hemispheric convolution kernels, and local hemispheric convolution kernels along the spatial dimension; the temporal features are added as additional feature inputs, and a final learned spatio-temporal feature representation $Z_{fusion}$ of global hemispheric fusion is generated by the following formulas:

$$Z_{fusion} = GAP(f_{bn}(AP(\Phi_{L-ReLu}(Conv1D(Z,(3,1))))));$$

$$Z = \text{Attention}(Q, K, V) + F'' + F;$$

where Z denotes a splicing of the feature map F output by the self-attention output Attention(Q,K,V) and the spatial feature extraction module and the spatial feature output F" by CBAM processing of F, $f_{bn}$ is a batch normalization function, GAP( ) denotes a global average pooling layer, $\Phi_{L-ReLU}$ is the Leaky ReLU activation function, AP is the average pooling layer, Conv1D( ) denotes the one-dimensional convolution operation, and the convolution kernel size is (3,1);

$Z_{fusion}$ is input into a fully connected layer and activated by a softmax function, a final output OutPut may be calculated in the following ways:

$$OutPut = \Phi\text{softmax}(W'\Phi dp(\Phi ReLU(W(\Gamma(Zfusion)) + b)) + b')$$

$$OutPut = \Phi_{softmax}(W'\Phi_{dp}(\Phi_{ReLU}(W(\Gamma(Z_{fusion})) + b)) + b');$$

where Γ is a squeeze operation, W and W' are trainable weight matrices, b and b' are deviation terms, $\Phi_{ReLU}$ is a ReLU activation function, applied to an output of linear transformation, $\Phi_{dp}$ is a dropout operation, configured to prevent overfitting, and $\Phi_{softmax}$ is a softmax function, configured to convert the output into a probability distribution.

Here, for the feature output Z of the previous stage, a one-dimensional convolutional layer with a kernel size of (3,1) is used to fuse information along the spatial dimension. After LeakyReLU, average pooling, and batch normalization, a global average pooling layer (GAP) is added to overcome over-fitting and reduce the model size. Finally, the spatio-temporal feature representation $Z_{fusion}$ of the feature output is learned, and $Z_{fusion}$ will be input into the fully connected layer. The final output layer is activated by the softmax function. Thus, the learning information from the global, hemisphere, and local hemisphere is fused into an advanced spatio-temporal feature representation.

The following is a specific implementation example provided to illustrate the abovementioned emotion recognition method based on the spatio-temporal multi-scale attention convolutional neural network. It should be noted, however, that this example is intended solely to clarify the invention and should not be construed as unduly limiting its scope.

In the experimental setup, each trial was divided into four non-overlapping segments, referred to as clip-level trials. To prevent potential data leakage, subject-based 10-fold cross-validation was applied for each participant in the dataset. The rationale for using clip-level trials is that prediction based on shorter segments is more practical for building an efficient recognition system, compared to the trial-based prediction commonly evaluated in prior studies. This approach also better simulates real-world scenarios where test data distributions are unknown, thus requiring a decoding model with strong generalization capability. In each experiment, participants were exposed to audio or visual stimuli designed to elicit specific emotional states. As emotion is a continuous cognitive process, data segments from the same trial are highly correlated. Randomly shuffling segments across subjects before splitting data into training and test sets could result in adjacent segments appearing in both sets, leading to artificially high classification performance. However, such a model would likely perform poorly in real-world settings when encountering unseen, highly correlated segments. To obtain a more generalizable evaluation, 10-fold cross-validation was performed at the subject level, ensuring that adjacent segments from the same subject do not appear in both training and test sets. In each iteration of the 10-fold cross-validation, one fold was held out as test data, while the remaining nine folds were used as training data. From these nine training folds, the data were further divided randomly into 80% for training and 20% for validation. During training, the network was trained for over 500 epochs. In each epoch, performance was evaluated on the validation set. The model achieving the highest accuracy on the validation data across all 500 epochs was saved and subsequently evaluated on the test set. This procedure was repeated 10 times for each subject, rotating the test fold each time, until every fold had been used as the test set once. Throughout this process, the test data remained completely unseen during all training and validation phases. Finally, for each subject in the 10-fold cross-validation, the highest accuracy and highest F1 score from each fold were recorded. The average of these 10 values was then computed to assess the overall performance of the model.

The proportional coefficient of the T-core length of the DEAP data set is [0.25, 0.50, 1.00]. The sampling rate of the DEAP data is 128 Hz, so the length of the time kernel is 32, 64, and 128, respectively. The maximum number of training rounds for model training is 500. The batch size of the DEAP dataset is set to 64, and the Adam optimizer is used to optimize the training process. The initial learning rate is $1e^{-3}$. Meanwhile, the cross entropy loss is selected as the loss function to guide the training process. The relevant calculation formula is as follows:

$$L(y, \hat{y}) = -(y\log(\hat{y}) + (1 - y)\log(1 - \hat{y}));$$

where $L(y, \hat{y})$ is the loss value, y is the real label (0 or 1), and $\hat{y}$ is the probability of model prediction (i.e., the probability of prediction for category 1).

To evaluate the trained lightweight convolutional neural network model, experiments are conducted on the publicly available benchmark dataset known as the Database for Emotion Analysis using Physiological Signals (DEAP). DEAP is a multimodal dataset for human emotional states, containing electroencephalography (EEG), facial expression, and galvanic skin response (GSR) recordings. Thirty-two participants watch music video clips while their EEG, facial expressions, and GSR signals are recorded.

During the processing of the DEAP dataset, the 3-second pre-trial baseline period is first removed from each trial. The data are then downsampled from the original 512 Hz to 128 Hz to reduce data volume and computational load. A blind source separation method is applied to remove electrooculogram (EOG) artifacts caused by eye movements. To effectively suppress both low-frequency noise and high-frequency noise, a band-pass filter with a lower cutoff of 4.045 Hz is applied to the raw EEG signals. Finally, all EEG channels are re-referenced to a common average reference to minimize the effect of the reference electrode and facilitate signal comparison. The DEAP dataset includes emotional dimensions for arousal, valence, and dominance. For label processing, the original rating scale for each dimension ranges from 1 to 9. A threshold of 5 is used to discretize the ratings into two classes, low and high, for each dimension. The present invention focuses solely on the arousal and valence dimensions.

Given that deep neural networks typically contain a large number of trainable parameters and require substantial labeled data to effectively learn emotional representations from EEG, the limited number of trials in the selected dataset poses a challenge. To address this, the invention introduces a data augmentation strategy that divides each trial into non-overlapping 4-second segments. These segments are then used to train the lightweight convolutional neural network, thereby enhancing model performance.

One of the evaluation metrics used is accuracy, which is one of the most common performance measures for classification tasks. It is defined as the ratio of correctly predicted samples to the total number of samples. In the case of binary classification, accuracy is defined as follows:

$$\text{Accuracy} = \frac{TP + TN}{TP + FP + TN + FN};$$

where TP is true positive, TN is true negative, FP is false positive, and FN is false negative.

Accuracy can measure the accuracy of a class-balanced data set prediction. After preprocessing the labels mentioned in the preprocessing part, the labels become unbalanced. In order to better evaluate the performance of the classifier on class-imbalanced datasets, the F1 score is added, which combines the precision and recall of the classifier, and is defined as the harmonic mean of the precision and recall of the classifier. F1 is defined as follows.

$$\text{Precision} = \frac{TP}{TP + FP},\ \text{Recall} = \frac{TP}{TP + FN};$$

$$F_1 = 2 \times \frac{\text{Precision} \times \text{Recall}}{\text{Precision} + \text{Recall}} = \frac{TP}{TP + \frac{1}{2}(FP + FN)};$$

where TP is true positive, TN is true negative, FP is false positive, and FN is false negative.

The final evaluation results are shown in Table 1. Table 1 shows the performance comparison of different methods in arousal and valence tasks, including accuracy, F1 score, and parameter quantity.

TABLE 1

Comparison of the evaluation results of the invention method and the existing method

| Method | Arousal | | Valence | | Parameter |
|---|---|---|---|---|---|
| | Accuracy | F1 score | Accuracy | F1 score | quantity |
| SVM | 60.37% | 57.33% | 55.19% | 57.87% | — |
| KNN | 59.48% | 57.64% | 53.03% | 55.12% | — |
| EEGNet | 58.29% | 60.60% | 54.56% | 57.61% | 2162 |
| SCN | 61.19% | 61.19% | 59.42% | 62.26% | 48162 |
| DCN | 61.03% | 62.58% | 59.92% | 62.04% | 151252 |
| This invention | 85.39% | 87.12% | 71.23% | 72.44% | 6978 |

In the emotional classification task methods based on EEG signals listed in Table 1, the principles and characteristics of each method are different. SVM separates different emotion categories by constructing a hyperplane, which is suitable for linearly separable simple tasks; KNN votes to determine the sentiment category based on the distance between samples, but its ability to process high-dimensional data is limited. EEGNet uses a convolutional neural network to extract the spatio-temporal features of EEG signals, which can capture complex local patterns. SCN adapts to the complexity of EEG data by dynamically adjusting the network structure and improves the generalization ability of the model. DCN extracts the high-level pattern features of EEG signals through deep convolution, which further enhances the ability to capture complex emotional patterns.

Figure 6:
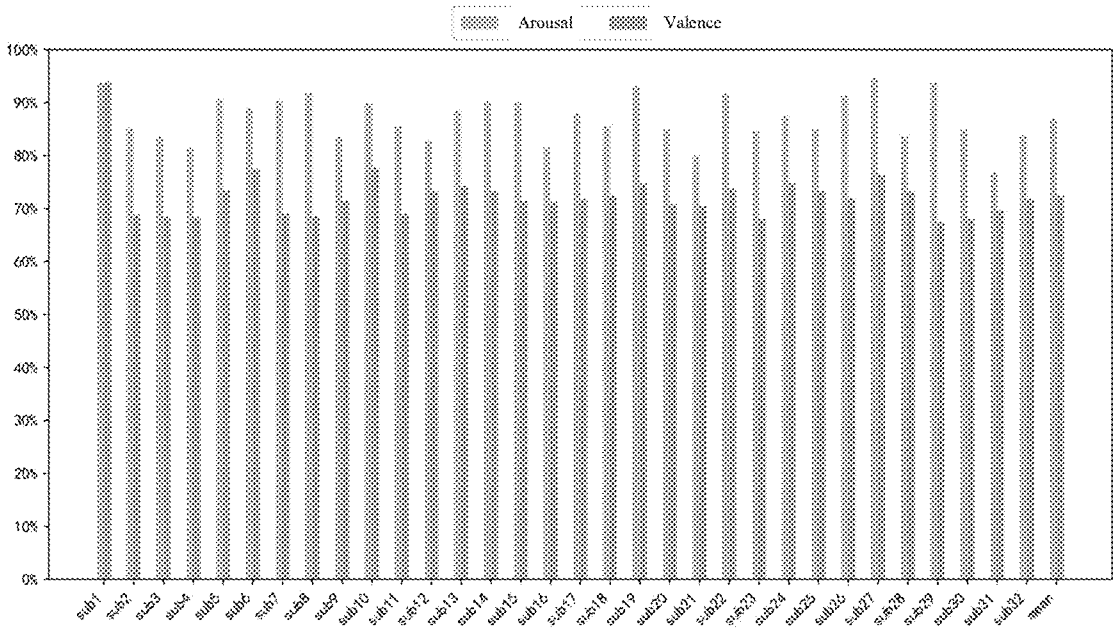
FIG. 6 is a statistical diagram of the accuracy of each subject's arousal and valence on the DEAP data set provided by the embodiment of the invention.
Figure 7:
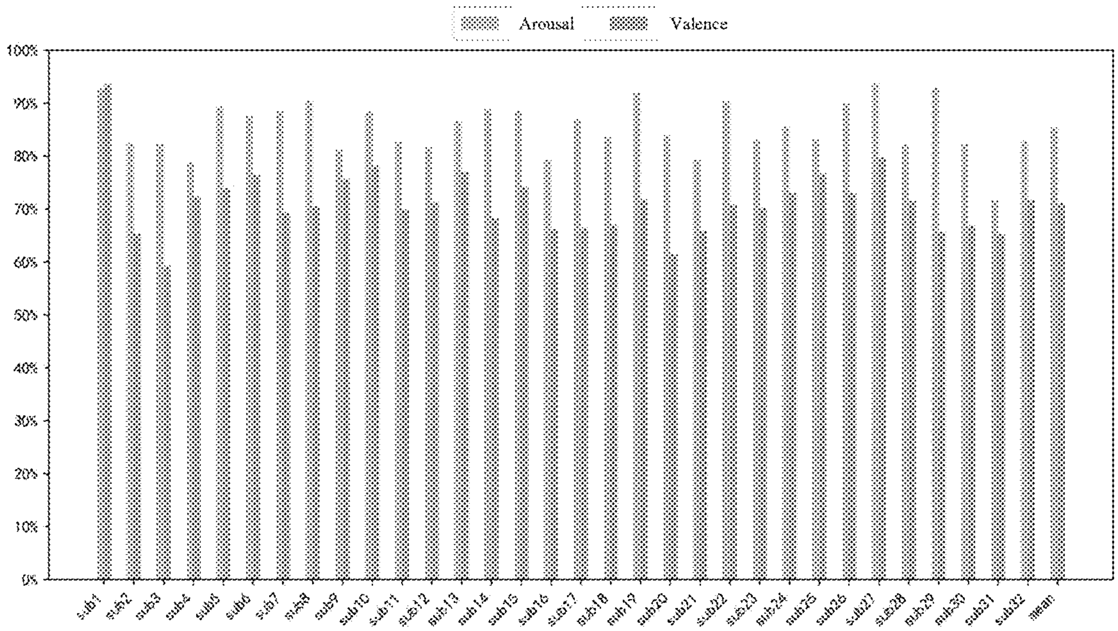
FIG. 7 is the F1 score statistics of each subject's arousal and valence on the DEAP dataset provided by the embodiment of the invention.

As shown in the statistical results of FIG. 6 and FIG. 7, the proposed method significantly outperforms other approaches in both accuracy and F1 score for arousal and valence, reaching 85.39% and 87.12% for arousal, and 71.23% and 72.44% for valence, respectively. At the same time, the number of parameters is only 6,978, reflecting higher performance and model efficiency. These results demonstrate that the proposed method holds notable advantages in EEG signal feature extraction and emotion classification tasks.

In contrast, traditional methods such as SVM and KNN show limited performance due to their restricted feature extraction capabilities. Compared to EEGNet, although the parameter count of the proposed method increases, the accuracy for arousal and valence rises by 27.10% and 16.67%, respectively, while the F1 score improves by 26.52% and 14.83%, respectively. The performance gain substantially outweighs the increase in parameters, highlighting higher model efficiency. Furthermore, compared to other deep learning methods such as SCN and DCN, the proposed method achieves significantly superior performance, while its parameter count is considerably lower than that of SCN (48,162) and DCN (151,252), further validating its balanced advantage between performance and complexity.

Further analysis indicates that the proposed method substantially reduces model complexity while maintaining high classification performance, achieved through optimized network architecture and feature extraction strategies. This efficient design renders the method not only suitable for emotion classification tasks but also highly practical, particularly in real-time emotion monitoring scenarios with limited computational resources.

The emotion recognition method based on the spatio-temporal multi-scale attention convolutional neural network introduced in this invention incorporates the principle of brain emotional asymmetry. It extracts emotional state-related hemispheric asymmetry patterns using hemispherical convolution kernels whose length corresponds to the number of left and right hemisphere channels, thereby contributing to improved emotion recognition accuracy. On the other hand, by employing multi-scale one-dimensional convolutional layers, the model extracts features from multiple temporal and spatial dimensions in parallel from the input data. This enables the model to capture characteristics and variation patterns of the data across different time and space scales.

This method implements an end-to-end EEG emotion recognition model without requiring manual feature extraction. By constructing multi-scale temporal and spatial convolutional networks, it effectively learns the intrinsic relationships between local and global channels of EEG signals. This leads to a significant improvement in recognition accuracy while effectively reducing the number of model parameters.

It should be understood that the phrases “in one embodiment” or “in an embodiment” used throughout this specification mean that the specific features, structures, or characteristics described in connection with that embodiment are included in at least one embodiment of the invention. Therefore, the appearances of these phrases throughout the specification are not necessarily all referring to the same embodiment. Furthermore, these specific features, structures, or characteristics may be combined in any suitable manner in one or more embodiments. It should also be understood that, in the various embodiments of the invention, the sequence numbers of the processes do not imply their order of execution. The execution order of each process should be determined by its function and internal logic and should not be construed as limiting the implementation of the embodiments of the invention. The sequence numbers of the embodiments are for descriptive purposes only and do not indicate any preference or superiority among the embodiments.

It should be noted that, as used herein, the terms “comprise”, “include”, or any other variation thereof, are intended to cover non-exclusive inclusion, so that a process, method, article, or device that comprises a list of elements includes not only those elements but also other elements not explicitly listed, or elements inherent to such a process, method, article, or device. In the absence of further limitation, an element defined by the phrase “comprising a . . . ” does not exclude the presence of additional identical elements in the process, method, article, or device that includes the element.

In the several embodiments provided by the invention, it should be understood that the disclosed method may also be implemented in other ways. The methods disclosed in the several method embodiments may be freely combined in the absence of conflict to form new method embodiments. Similarly, the features disclosed in the several method embodiments may also be combined without conflict to form new method embodiments.

The foregoing describes only exemplary implementations of the invention. However, the scope of protection of the invention is not limited thereto. Any person familiar with the technical field of the invention may readily conceive of variations or substitutions within the technical scope disclosed by the invention, which should fall within the protection scope of the invention. Therefore, the protection scope of the invention shall be subject to the scope defined by the claims.

What is claimed is:

1. An emotion recognition method based on a spatio-temporal multi-scale attention convolutional neural network, comprising:

collecting EEG data of a subject for preprocessing, and performing a channel mapping according to a physical position of an electrode to obtain EEG data containing at least a spatial dimension and a temporal dimension;

building a lightweight convolutional neural network including a two-stream spatio-temporal feature construction layer, a hybrid attention mechanism layer, a high-order fusion layer and a classification layer; wherein, the two-stream spatio-temporal feature construction layer comprises a temporal feature extraction module, configured to learn time-frequency feature representation by using a multi-scale one-dimensional temporal convolution kernel, and a parallel spatial feature extraction module, configured to learn an asymmetric representation between left and right hemispheres by using a hemispherical convolution kernel and a local hemispherical convolution kernel with a length corresponding to a count of channels in left and right hemispheres; the hybrid attention mechanism layer combines a channel attention mechanism, a spatial attention mechanism and a self-attention mechanism to enhance an ability of feature extraction and data processing; the high-order fusion layer is configured to relearn from a learned global convolution kernel to a representation of a local hemisphere convolution kernel; and using a trained lightweight convolutional neural network to identify the EEG data, and obtaining an emotional recognition result of the subject.

2. The emotion recognition method according to claim 1, wherein the temporal feature extraction module comprises a multi-scale one-dimensional temporal convolution kernel, wherein, a size $$s_T^i$$

of an i-th level one-dimensional temporal convolution kernel is defined as $$s_T^i = (1, \delta^i \cdot f_s),$$

where $f_s$ is an EEG signal sampling rate, i∈[1, 2, . . . , L], L is a count of levels of the one-dimensional temporal convolution kernel layers, and proportional coefficients $\delta^i$ are 0.25, 0.5 and 1.0 when values of i are 1, 2 and 3, respectively, and wherein a scale coefficient corresponding to a high-level one-dimensional temporal convolution kernel is smaller than a scale coefficient corresponding to a low-level one-dimensional temporal convolution kernel.

3. The emotion recognition method according to claim 2, wherein an output $$Z_{temporal}^i$$

of the i-th level one-dimensional temporal convolution kernel in the temporal feature extraction module is defined as $$Z_{temporal}^i = AP(\Phi_{L\text{-}ReLU}(Conv1D(X, s_T^i))),$$

where X is input EEG data, Conv1D( ) is a one-dimensional convolution operation with a convolution kernel size of $$s_T^i$$

and a stride of (1,1), $\Phi_{L\text{-}ReLU}(\,)$ is a Leaky ReLU activation function, AP( ) is an average pooling operation;

wherein the output $$Z_{temporal}^i$$

of the one-dimensional temporal convolution kernel of each level will be connected in series along a temporal dimension, and a batch normalization operation is added to obtain an output of the temporal feature extraction module.

4. The emotion recognition method according to claim 1, wherein the spatial feature extraction module has multi-scale one-dimensional spatial convolution kernels, comprising: a global convolution kernel, configured to learn global spatial information; a hemispheric convolution kernel, and a local hemispheric convolution kernel, configured to extract a relationship between the left and right hemispheres through shared convolution kernels;

wherein a size $$s_S^j$$

of the one-dimensional spatial convolution kernel may be defined as $$s_S^j = (\delta^j \cdot c, 1),$$

where c is a total number of input EEG segment channels, and j takes 1, 2, and 3 to represent the global convolution kernel, hemispherical convolution kernel, and local hemispherical convolution kernel, and the corresponding $\delta^j$ are 0.25, 0.5, and 1.0, respectively; the output $$Z_{spatial}^j$$

of the j-th type of spatial convolution kernel is defined as $$Z_{spatial}^j = AP(\Phi_{L\text{-}ReLU}(Conv1D(Z_S, s_S^j)));$$

where $$Z^{j}_{spatial} \in R^{n \times s \times c_m \times f},$$

n is a count of samples, s is a count of one-dimensional space convolution kernels of each type, $c_m$ is a count of channels after a m-th spatial convolution, $f$ is a feature length after each spatial convolution operation, $Z_S$ is a multi-scale spatial representation generated by a parallel multi-scale spatial convolution kernel of the input EEG data, Conv1D( ) is an one-dimensional convolution operation, a convolution kernel size is $$s^{j}_{S},$$

the stride of (c, 1) is configured for the global convolution kernel, the stride of (0.5×c, 1) is configured for the hemispheric convolution kernel, the stride of (0.25×c, 1) is configured for the local hemispheric convolution kernel, $\Phi_{L\text{-}ReLU}$ is the Leaky ReLU activation function, AP is an average pooling layer.

5. The emotion recognition method according to claim 4, wherein the method also comprises: For the EEG data input into the hemispheric convolution kernel, the Fz, Cz, Pz, Oz electrode data located in the midline position are deleted, and a channel arrangement order is set to [$channel_{left}$, $channel_{right}$], where $channel_{left}$ denotes a channel located in the left hemisphere and $channel_{right}$ denotes a channel located in the right hemisphere; the channel order on each hemisphere is rearranged so that each kernel weight is shared between electrode pairs symmetrically placed on the two hemispheres.

6. The emotion recognition method according to claim 1, wherein the following operations are used in both temporal convolution operation and spatial convolution operation to reduce parameters and computation:

first, independent deep convolution is performed on the input channel of each EEG data, and then 1×1 convolution is used for feature combination between channels.

7. The emotion recognition method according to claim 1, wherein in a self-attention mechanism part of a mixed attention mechanism layer, the self-attention mechanism part of a mixed attention mechanism layer is used, and a query vector Q, a key vector K and a value V are generated by using the formula $[Q,K,V]=z_0U_{qkv}$; in the formula, $z_0$ is an input feature vector, $U_{qkv}$ is a linear transformation matrix;

the self-attention output Attention(Q,K,V) is calculated by the following formula:

$$\text{Attention}(Q, K, V) = U_{proj}\left(D \odot Q \odot U_{copy}\left(\frac{K}{Scale_K} \odot \frac{V}{Scale_V}\right)U_{sum}\right);$$

$$\text{Scale}_V = \|V_{-1}\|_2,\ \text{Scale}_K = \|K_{-1}\|_2;$$

where D is a dynamic scaling matrix, ⊙ denotes the Hadamard product, $U_{copy}$ and $U_{sum}$ are linear transformation matrices; $Scale_V$ is an L2 norm of V; $Scale_K$ is an L2 norm of K.

8. The emotion recognition method according to claim 1, wherein in the hybrid attention mechanism layer, an improved Convolutional Block Attention Module (CBAM) is added to the spatial features output by the two-stream spatio-temporal feature construction layer; the improved CBAM module combines the channel attention mechanism and the spatial attention mechanism, and uses a feature map F output by the spatial feature extraction module as input to obtain a channel attention mapping $M_c(F)$ and a spatial attention mapping $M_s(F')$ in turn, and uses the convolutional layer as a shared network to replace a shared MLP layer in an original CBAM, a final feature representation is output; the convolution layer is composed of a convolution containing a hidden layer; $M_c(F)$ and $M_s(F)$ are calculated by the following formulas:

$$M_c(F) = \sigma\left(W_1\left(W_0\left(F^c_{avg}\right)\right) + W_1\left(W_0\left(F^c_{max}\right)\right)\right) = \sigma(Conv(AvgPool(F) + Conv(MaxPool(F))));$$

$$M_s(F) = \sigma\left(f^k([AvgPool(F); MaxPool(F)])\right) = \sigma\left(f^k\left(\left[F^s_{avg}; F^s_{max}\right]\right)\right);$$

where AvgPool(F) and MaxPool(F) respectively denote the average pooling operation and a maximum pooling operation of the feature map F output by the spatial feature extraction module, AvgPool(F') and MaxPool (F') respectively denote the average pooling operation and the maximum pooling operation of the feature map F' output by the channel attention;

$$F^c_{avg} \text{ and } F^c_{max}$$

are the average pooling feature and the maximum pooling feature in the channel attention, respectively;

$$F^s_{avg} \text{ and } F^s_{max}$$

are the average pooling feature and the maximum pooling feature in spatial attention, respectively; both $W_0$ and $W_1$ are weight matrices that may be learned, $f^k$ denotes convolution operations, and σ( ) is a Sigmoid function.

9. The emotion recognition method according to claim 1, wherein the high-level fusion layer is used to use a one-dimensional convolution layer with a kernel size of (3,1) to fuse learning information from global convolution kernels, hemispheric convolution kernels, and local hemispheric convolution kernels along the spatial dimension; the temporal features are added as additional feature inputs, and a final learned spatio-temporal feature representation $Z_{fusion}$ of global hemispheric fusion is generated by the following formulas:

$$Z_{fusion} = GAP(f_{bn}(AP(\Phi_{L\text{-}ReLu}(Conv1D(Z, (3, 1))))));$$

$$Z = \text{Attention}(Q, K, V) + F'' + F;$$

where Z denotes a splicing of the feature map F output by the self-attention output Attention(Q,K,V) and the spatial feature extraction module and the spatial feature output F" by CBAM processing of F, $f_{bn}$ is a batch normalization function, GAP( ) denotes a global average pooling layer, $\Phi_{L\text{-}ReLU}$ is the Leaky ReLU activation function, AP is the average pooling layer, Conv1D( ) denotes the one-dimensional convolution operation, and the convolution kernel size is (3,1);

$Z_{fusion}$ is input into a fully connected layer and activated by a softmax function, a final output OutPut may be calculated in the following ways:

$$OutPut - \Phi_{softmax}(W'\Phi_{dp}(\Phi_{ReLU}(W(\Gamma(Z_{fusion})) + b)) + b');$$

where Γ is a squeeze operation, W and W' are trainable weight matrices, b and b' are deviation terms, $\Phi_{ReLU}$ is a ReLU activation function, applied to an output of linear transformation, $\Phi_{dp}$ is a dropout operation, configured to prevent overfitting, and $\Phi_{softmax}$ is a softmax function, configured to convert the output into a probability distribution.

* * * * *